US010372319B2

(12) United States Patent
Hammendorp et al.

(10) Patent No.: US 10,372,319 B2
(45) Date of Patent: Aug. 6, 2019

(54) METHOD, APPARATUS AND COMPUTER PROGRAM PRODUCT FOR ENABLING SCRUBBING OF A MEDIA FILE

(71) Applicant: HERE GLOBAL B.V., Eindhoven (NL)

(72) Inventors: Maarten Hammendorp, Palo Alto, CA (US); Charlie Sutton, San Francisco, CA (US); Pascal Wever, Los Angeles, CA (US); Sebastian Frey, Woodland Hills, CA (US)

(73) Assignee: HERE GLOBAL B.V., Eindhoven (NL)

( * ) Notice: Subject to any disclaimer, the term of this patent is extended or adjusted under 35 U.S.C. 154(b) by 886 days.

(21) Appl. No.: 14/540,152

(22) Filed: Nov. 13, 2014

(65) Prior Publication Data

US 2016/0139794 A1   May 19, 2016

(51) Int. Cl.
| | | |
|---|---|---|
| G06F 3/0481 | (2013.01) | |
| G06F 3/0488 | (2013.01) | |
| H04L 29/08 | (2006.01) | |
| G06F 3/0484 | (2013.01) | |
| G11B 27/00 | (2006.01) | |
| G06F 3/0485 | (2013.01) | |
| H04W 4/02 | (2018.01) | |

(52) U.S. Cl.
CPC ........ *G06F 3/04883* (2013.01); *G06F 3/0484* (2013.01); *G06F 3/0485* (2013.01); *G06F 3/0488* (2013.01); *G11B 27/005* (2013.01); *H04L 67/10* (2013.01); *H04W 4/02* (2013.01)

(58) Field of Classification Search
CPC .... G06F 3/0484; G06F 3/0485; G06F 3/0488; G06F 3/04883
See application file for complete search history.

(56) References Cited

U.S. PATENT DOCUMENTS

| | | | |
|---|---|---|---|
| 7,355,620 B2 | 4/2008 | Ikehata et al. | |
| 2008/0084400 A1 | 4/2008 | Rosenberg | |

(Continued)

FOREIGN PATENT DOCUMENTS

| | | |
|---|---|---|
| WO | WO 2009/088641 A1 | 7/2009 |
| WO | WO 2013/173363 A2 | 11/2013 |
| WO | WO 2014/072567 A1 | 5/2014 |

OTHER PUBLICATIONS

Fast Forward in QuickTime & Speed Reverse with Gestures [online] [retrieved Jan. 27, 2015]. Retrieved from the Internet: http://osxdaily.com/2010/11/16/fast-forward-in-quicktime/ (dated Nov. 16, 2010); 5 pages.

*Primary Examiner* — Matthew Ell
(74) *Attorney, Agent, or Firm* — Alston & Bird LLP

(57) ABSTRACT

A method, apparatus and computer program product are provided for enabling scrubbing of a media file. Swiping gestures of varying speeds and directions may applied to a touch screen display such that a playhead indicating a selected frame of a media file moves at speeds relative to the swiping gesture, and in a direction of the swiping gesture. When the swiping gesture falls below a threshold speed, fine control in frame-by-frame increments is enabled. A user may therefore select a precisely desired frame for purposes such as playback and/or video editing, with a continuous swiping gesture and in as small as a space as provided by the touch screen display of a mobile device.

18 Claims, 4 Drawing Sheets

(56) References Cited

U.S. PATENT DOCUMENTS

| | | | |
|---|---|---|---|
| 2009/0019476 A1* | 1/2009 | Ohlfs | H04N 5/783 |
| | | | 725/38 |
| 2009/0144623 A1* | 6/2009 | Jung | G06F 3/0488 |
| | | | 715/716 |
| 2009/0174677 A1* | 7/2009 | Gehani | G06F 3/04847 |
| | | | 345/173 |
| 2009/0325607 A1* | 12/2009 | Conway | G06F 1/1624 |
| | | | 455/456.3 |
| 2010/0110034 A1* | 5/2010 | Teng | G06F 3/0485 |
| | | | 345/173 |
| 2010/0231537 A1* | 9/2010 | Pisula | G06F 3/0481 |
| | | | 345/173 |
| 2010/0235794 A1* | 9/2010 | Ording | G06F 3/0485 |
| | | | 715/863 |
| 2011/0074699 A1* | 3/2011 | Marr | G06F 3/0485 |
| | | | 345/173 |
| 2012/0054612 A1 | 3/2012 | Bok et al. | |
| 2013/0002589 A1* | 1/2013 | Jang | G06F 3/0485 |
| | | | 345/173 |
| 2013/0067332 A1* | 3/2013 | Greenwood | G06F 3/0488 |
| | | | 715/720 |
| 2013/0080895 A1 | 3/2013 | Rossman et al. | |
| 2014/0282224 A1* | 9/2014 | Pedley | G06F 3/017 |
| | | | 715/784 |
| 2015/0089369 A1* | 3/2015 | Ahn | G06F 3/0485 |
| | | | 715/716 |
| 2015/0193099 A1* | 7/2015 | Murphy | G06F 3/0481 |
| | | | 715/777 |

* cited by examiner

METHOD, APPARATUS AND COMPUTER PROGRAM PRODUCT FOR ENABLING SCRUBBING OF A MEDIA FILE

TECHNOLOGICAL FIELD

An example embodiment of the present invention relates generally to enabling scrubbing of a media file, and more particularly, to a method, apparatus and computer program product for enabling scrubbing of a media file with a swiping gesture on a mobile device.

BACKGROUND

Improvements to the processing power and memory capacity of mobile devices has led to an increase of use of mobile devices for audio and video capture functions. Because of the widespread availability of mobile devices including cameras, users are quick to capture media files, such as video and/or audio files, of a wide variety of events that occur both in everyday life and on special occasions. Previous limitations of mobile devices have been improved to the extent that many users rely on their mobile smart phones for media capture instead of an additional, bulkier camera or recording device.

Furthermore, the popularity of social networking has also led to an increase in use of mobile devices for recording media. Users capture media with their mobile devices and upload the media on the fly so as to share the media on social networking sites and the like. In some examples, a user may wish to edit a media file, such as to upload only a portion of a media file instead of the entire media file, or add audio or visual affects to a specific portion of a media file, for example.

However, some limitations still exist with regard to the small nature of such mobile devices and the ability to configure and manipulate media files on the mobile device. Such limitations particularly limit the ability of a user to edit a precise portion of a relatively long media file using a relatively small user interface of a mobile device. Many users therefore must first transmit such media files to a laptop or personal computer to work with the media file.

BRIEF SUMMARY

A method, apparatus, and computer program product are therefore provided for enabling scrubbing of a media file with a swiping gesture. Scrubbing refers to moving a playhead (e.g., a starting point of the media file at which to resume playback, or to begin editing) to a desired particular frame of a media file. Certain example embodiments described herein may provide for efficient movement of a playhead in a media file with the use of a continuous swiping gesture provided via the touch screen display of a mobile device. For example, a user may capture media content on a device and desire to edit the media content by incorporating an audio file at a particular position in the video file. As another example, a user may want to enhance or edit certain qualities of a media file and may need to narrow selection to a particular frame or frames. According to example embodiments, playback may also be provided to enable user selection of an intended selection point. In general, the user makes swiping gestures in varying speeds and directions on the mobile device touch screen to control a playhead, or selection point, of the media file to the precise desired frame of the media file. As commonly described herein, the user may make swiping gestures to a touch screen display. However, it will be appreciated that other types of user interfaces and use inputs to the user interfaces may be used, according to example embodiments. For example, a user may provide user inputs with a mouse, in positions indicated by a cursor on a display.

In an example embodiment, a method for enabling scrubbing of a media file with use of a touch screen display is provided that includes receiving an indication of a swiping gesture, determining a number of frames by which to move a playhead. The number of frames may be determined based upon a seek calculation, which, in turn, is based on a first speed of the swiping gesture, the distance of the swiping gesture, and an inflection value. The inflection value is predefined as the speed at which the playhead moves at a same speed as the swiping gesture. The method may also include identifying an updated playhead position based on a previous position of the playhead and the seek calculation, and causing the playhead to move to the updated playhead position.

In some embodiments, the method further includes receiving an indication of a continuation of the swiping gesture, such as in an instance in which a pointing object is not removed from the touch screen display surface during the swiping gesture. The method of this embodiment calculates a second seek calculation based on a second speed that varies from the first speed, a second direction of the continuation of the swiping gesture, a second distance of the continuation of the swiping gesture, and the inflection value. The method of this embodiment also identifies a second playhead position based on the updated playhead position and the second seek calculation, and causes the playhead to move to the second playhead position.

In some examples, the continuation of the swiping gesture comprises a change in direction such that second direction of the continuation of the swiping gesture is opposite of the first direction of the swiping gesture. In some embodiments, the method further includes causing playback of the media file at a current playhead position in response to removal of the swiping gesture.

In some examples, the seek calculation is calculated in frames as a direct proportion of the inflection value, the first speed, and the first distance. In some embodiments, the inflection value is a predefined number of frames per second, the first speed is determined in pixels per second, and the first distance is determined in pixels.

In some embodiments, the method further includes determining a unit of required distance of the swiping gesture by which to move the playhead one frame, determining the first speed is less than a threshold speed, and causing the playhead to move one frame per unit of required distance of the swiping gesture.

In another example embodiment, an apparatus is provided for enabling scrubbing of a media file with use of a touch screen display. The apparatus includes at least one processor and at least one memory including computer program code with the at least one memory and computer program code configured to, with the processor, cause the apparatus to perform receiving an indication of a swiping gesture, determining a number of frames by which to move a playhead. The number of frames may be determined based upon a seek calculation, which, in turn, is based on a first speed of the swiping gesture. The distance of the swiping gesture, and an inflection value, wherein the inflection value is predefined as the speed at which the playhead moves at a same speed as the swiping gesture. The at least one memory and computer program code are further configured for identifying an updated playhead position based on a previous position of the playhead and the seek calculation, and causing the playhead to move to the updated playhead position.

In some examples, the at least one memory and computer program code are further configured to cause the apparatus to perform receiving an indication of a continuation of the swiping gesture such as in an instance a pointing object is not removed from the touch screen display surface during the swiping gesture. The at least one memory and computer program are further configured for performing a second seek calculation based on a second speed that varies from the first speed, a second direction of the continuation of the swiping gesture, a second distance of the continuation of the swiping gesture, and the inflection value, identifying a second playhead position based on the updated playhead position and the second seek calculation, and causing the playhead to move to the second playhead position.

In some examples, the at least one memory and computer program code are further configured to cause the apparatus to perform causing playback of the media file at a current playhead position in response to removal of the swiping gesture. In some examples, the seek calculation is calculated in frames as a direct proportion of the inflection value, the first speed, and the first distance, wherein the inflection value is a predefined number of frames per second, the first speed is determined in pixels per second, and the first distance is determined in pixels.

In some examples, the at least one memory and computer program code are further configured to cause the apparatus to perform determining a unit of required distance of the swiping gesture by which to move the playhead one frame, determining the first speed is less than a threshold speed, and causing the playhead to move one frame per unit of required distance of the swiping gesture.

In a further example embodiment, a computer program product is provided for enabling scrubbing of a media file with use of a touch screen display. The computer program products includes at least one non-transitory computer-readable storage media having computer-executable program code portions stored therein with the computer-executable program code portions including program code instructions configured for receiving an indication of a swiping gesture. The program code instructions may be further configured for determining a number of frames by which to move a playhead. The number of frames may be based on a seek calculation, which, in turn, is based on a first speed of the swiping gesture, the distance of the swiping gesture, and an inflection value, wherein the inflection value is predefined as the speed at which the playhead moves at a same speed as the swiping gesture. The program code instructions may be further configured for identifying an updated playhead position based on a previous position of the playhead and the seek calculation, and causing the playhead to move to the updated playhead position.

In some embodiments, the computer-executable program code portions further include program code instructions configured for receiving an indication of a continuation of the swiping gesture, such as in an instance a pointing object is not removed from the touch screen display surface during the swiping gesture, performing a second seek calculation based on a second speed that varies from the first speed, a second direction of the continuation of the swiping gesture, a second distance of the continuation of the swiping gesture, and the inflection value, identifying a second playhead position based on the updated playhead position and the second seek calculation, and causing the playhead to move to the second playhead position.

In some examples, the continuation of the swiping gesture comprises a change in direction such that second direction of the continuation of the swiping gesture is opposite of the first direction of the swiping gesture.

In some embodiments, the computer-executable program code portions further include program code instructions configured for causing playback of the media file at a current playhead position in response to removal of the swiping gesture. In some examples, the seek calculation is calculated in frames as a direct proportion of the inflection value, the first speed, and the first distance, wherein the inflection value is a predefined number of frames per second, the first speed is determined in pixels per second, and the first distance is determined in pixels.

In some embodiments, the computer-executable program code portions further include program code instructions configured for determining a unit of required distance of the swiping gesture by which to move the playhead one frame, determining the first speed is less than a threshold speed, and causing the playhead to move one frame per unit of required distance of the swiping gesture.

In yet another example embodiment, an apparatus is provided that includes means for enabling scrubbing of a media file with use of a touch screen display. The apparatus comprises means for receiving an indication of a swiping gesture. The apparatus further includes means for determining a number of frames by which to move a playhead. The number of frames is based on a seek calculation, which, in turn, is based on a first speed of the swiping gesture, the distance of the swiping gesture, and an inflection value, wherein the inflection value is predefined as the speed at which the playhead moves at a same speed as the swiping gesture, means for identifying an updated playhead position based on a previous position of the playhead and the seek calculation, means for causing the playhead to move to the updated playhead position.

BRIEF DESCRIPTION OF THE DRAWINGS

Figure 1:
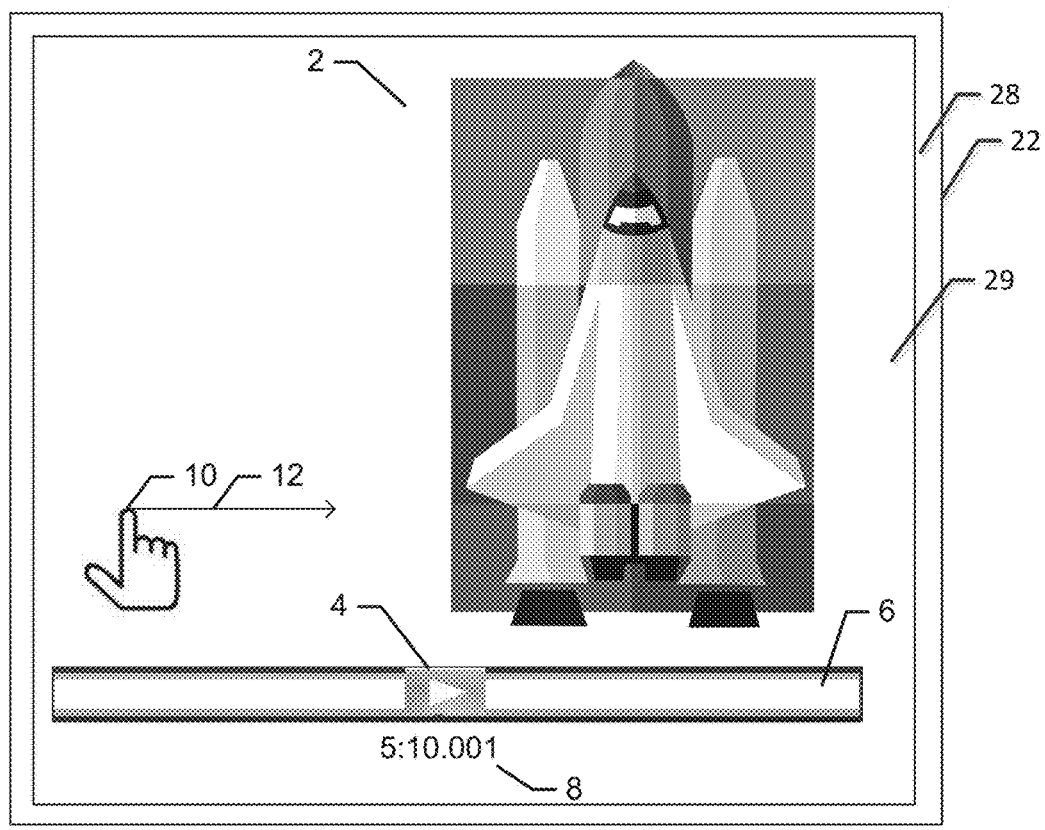
Figure 2:
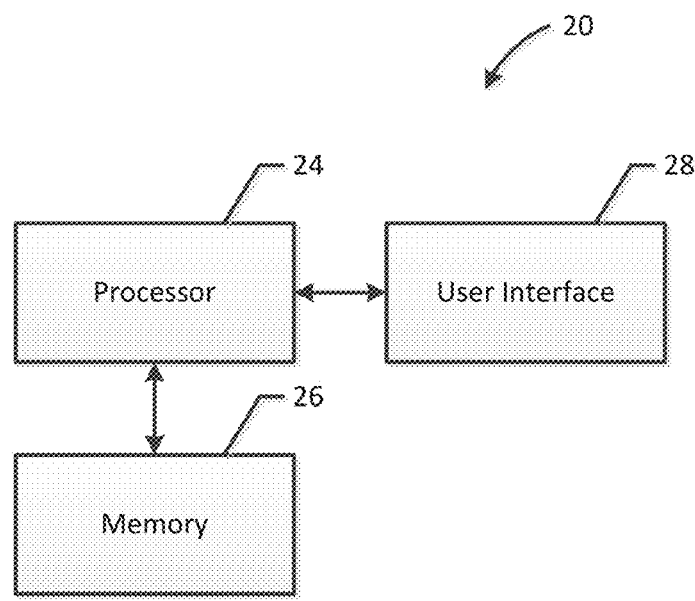
Figure 3:
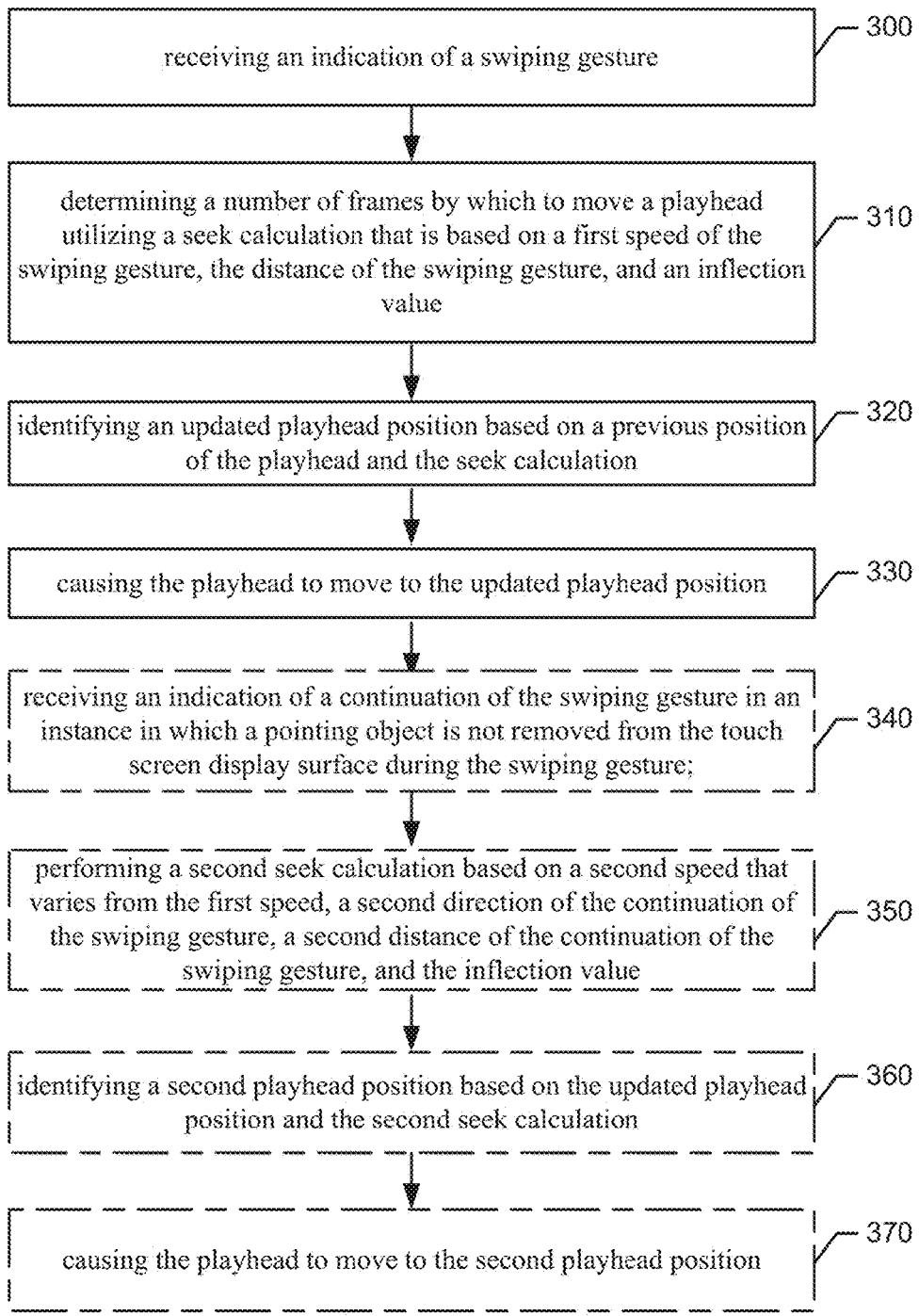
Figure 4:
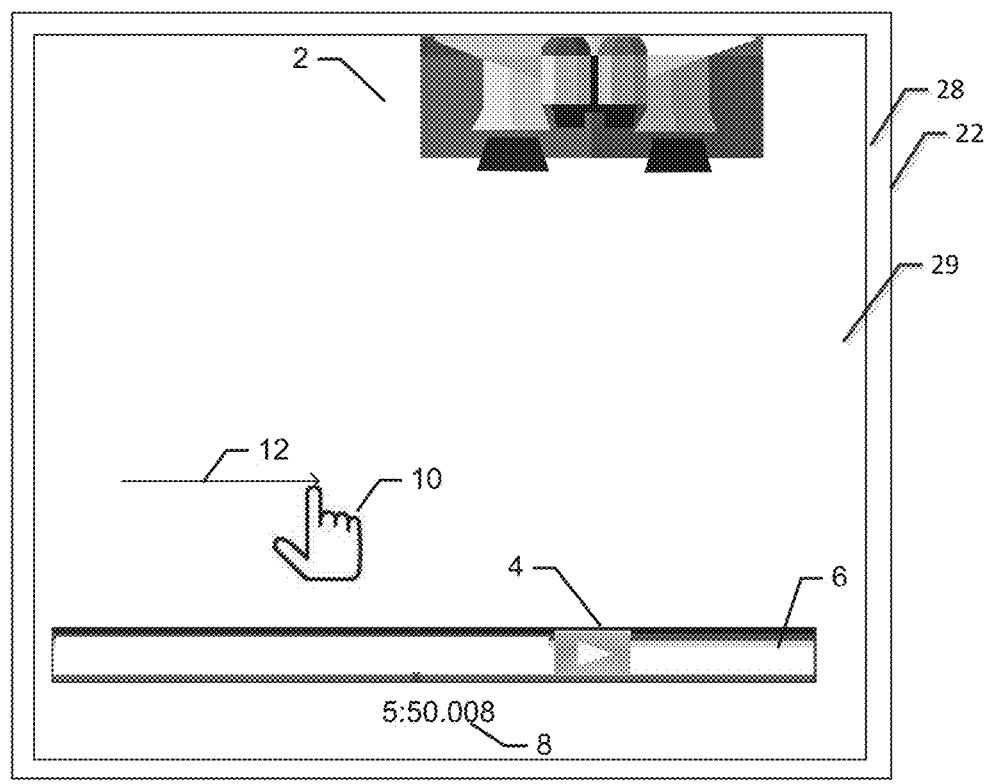
Figure 5:
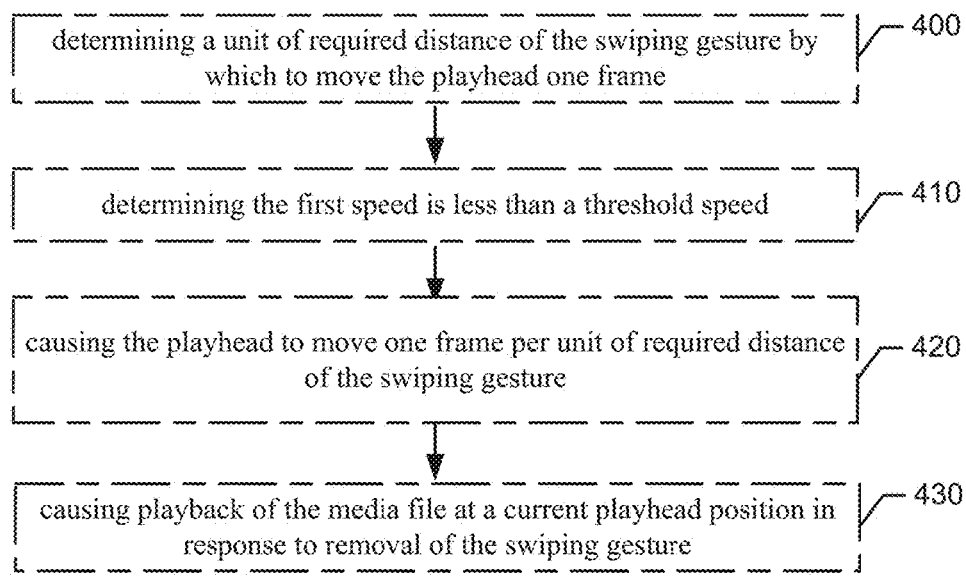

Having thus described certain example embodiments of the present invention in general terms, reference will hereinafter be made to the accompanying drawings which are not necessarily drawn to scale, and wherein:

FIG. 1 is an example user interface according to an example embodiment;

FIG. 2 is a block diagram of an apparatus that may be configured to provide a user interface in accordance with an example embodiment of the present invention;

FIG. 3 is a flowchart of operations for enabling scrubbing of a media file with a swiping gesture according to an example embodiment;

FIG. 4 is an updated example user interface following a swiping gesture according to an example embodiment; and FIG. 5 is a flowchart of operations for enabling scrubbing of a media file frame by frame with a swiping gesture according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention in order to enable scrubbing of a media file with a swiping gesture on a mobile device. FIG. 1 is an example user interface 28 for providing scrubbing and/or playback of a media file according to example embodiments. The user interface 28 may include at least a touch screen display 29 configured to display output to the user and to detect input by a pointing object, such as pointing object 10, which may include a hand, stylus, or any other object. The pointing object 10 may be swiped or dragged across the touch screen display 29, while maintaining contact with the touch screen display 29 as shown by the indication 12, to produce a swiping gesture. The touch screen display 29 and/or associated processing circuitry may detect various directions and/or speeds of the swiping gesture, which may be used to reposition a playhead of a media file as described herein.

Area 2 of the touch screen display 29 may be used to display a paused frame of a media file based on a current location of playhead 4, and/or may provide playback of the media file. The playhead 4 may visually represent a current location within the media file relative to the length of the media file as indicated by media bar 6. In some examples, the playhead 4 and/or media bar 6 is not displayed, but the playhead 4 may be referred to herein to refer to a selected position within the media file, at which position the media file may be paused, or at which playback will commence, and the media bar 6 may be referred to herein as a representation (whether visual or non-visual) of the length of the media file. As the playhead 4 moves as described herein according to example embodiments, area 2 may be updated accordingly to display a currently selected frame. In some examples, an indication of a current point in time or timestamp 8 may be provided that coincides with the position of the playhead 4 and/or currently selected frame of the media file. In some examples, an indication of the current point in time or timestamp 8 may not be displayed.

FIG. 2 is a schematic diagram of an example apparatus configured for performing any of the operations described herein. Apparatus 20 is an example embodiment that may be embodied by or associated with any of a variety of computing devices that include or are otherwise associated with a user interface that facilitates scrubbing of media files with a swiping gesture. For example, the computing device may be a mobile terminal, such as a personal digital assistant (PDA), mobile telephone, smart phone, companion device, for example, a smart watch, pager, mobile television, gaming device, laptop computer, camera, tablet computer, touch surface, video recorder, audio/video player, radio, electronic book or any combination of the aforementioned, and other types of voice and text communications systems. Alternatively, the computing device may be a fixed computing device, such as a personal computer, a computer workstation, a kiosk or the like. Still further, the apparatus may be embodied by or associated with a plurality of computing devices that are in communication with or otherwise networked with one another such that the various functions performed by the apparatus may be divided between the plurality of computing devices that operate in collaboration with one another. For purposes of illustration, but not of limitation, an apparatus 20 embodied by a mobile terminal 22, such as a smart phone, is depicted and will be described herein. However, the apparatus may be embodied by other types of computing devices as noted above.

The apparatus 20 may include, be associated with or otherwise in communication with a processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface that may be any means such as a device or circuitry embodied in either hardware or a combination of hardware and software that is configured to receive and/or transmit data from/to other electronic devices in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

FIG. 3 is a flowchart of operations for enabling scrubbing of a media file. As shown by operation 300, the apparatus 20, may include means, such as processor 24, user interface 28, and/or the like, for receiving an indication of a swiping gesture. The swiping gesture may be provided with a pointing object 10, for example, and may include a user swiping their finger across the touch screen display 29.

As shown by operation 310, the apparatus 20, may include means, such as processor 24, and/or the like for determining a number of frames by which to move a playhead. The number of frames may be based on a seek calculation, which, in turn, may be based on a first speed of the swiping gesture, the distance of the swiping gesture, and an inflection value. The inflection value may be predefined as the speed at which the playhead moves at the same speed as the swiping gesture.

For example, an inflection value of 100 pixels per second may indicate that the playhead moves at the same speed (100 pixels per second) as the pointing object 10 when the speed of the swiping gesture (e.g., pointing object 10) is 100 pixels per second. However, the number of frames, or time the playhead moves within the media file is dependent on the length of the media bar 6 in pixels. If the media bar 6 is 600 pixels long, and an example media file is 60 seconds, each pixel of the media bar 6 equates to approximately 0.1 seconds of the media file. Therefore, when a user provides a swiping gesture at a speed equaling the inflection value of 100 pixels per second, over a distance of 200 pixels, the playhead 4 moves approximately 200 pixels, or 20 seconds of the media file (200×0.1). If the media file provides a frame rate of 50 frames per second, the change to the playhead position, or seek calculation, may also be calculated as 1,000 frames (20×50). Therefore, the seek calculation, or movement of the playhead 4, may be first calculated in pixels, which corresponds to a change in point in time of the media file and/or frames of the media file.

The above example refers to a scenario in which the swiping gesture is provided at the same speed as the inflection value. A formula to calculate the number of frames based on the swiping gesture being the same speed as the inflection value may be number of frames=timespan of media file to skip×frame rate of media file, where the timespan of media file to skip=length of swiping gesture× (duration of media file÷length of media bar or touch screen display). Using the above example, the number of frames=200 pixels×(60 seconds÷ 600 pixels)×50 frames per second=1,000 frames.

It will be appreciated the length of the media bar 6 is referred to herein in order to determine movement of the playhead 4. In examples in which a media bar 6 is not present, a length of the touch screen display 29, or length of a predetermined portion of the touch screen display 29 may be used as a basis by which to determine movement of the playhead 4, instead of the length of the media bar 6.

As another example, the speed of the swiping gesture may vary from the inflection value. The seek calculation may, in some embodiments, be calculated as a direct proportion of the inflection value, the first speed, and the first distance. For example, using the above example of an inflection value of 100 pixels per second, a swiping gesture provided at the speed of 50 pixels per second may result in a movement of the playhead 4 that is half the speed of the swiping gesture. Said differently, a swiping gesture of 50 pixels per second and a distance of 200 pixels may result in a seek calculation of only 100 pixels. Given the above assumptions of a 600 pixel media bar, 60 second media file, and frame rate of 50 frames per second, the seek calculation may alternatively be calculated as 10 seconds of the media file, or 500 frames.

Therefore, a formula to calculate the number of frames by which to move the playhead 4 where swiping gesture speed varies from the inflection value may be number of frames=timespan of media file to skip×frame rate of media file, where the timespan of media file to skip=length of swiping gesture×(speed of swiping gesture÷inflection value)×(duration of media file÷length of media bar or touch screen display. Using the above example, the number of frames=200 pixels×(50 pixels/second÷100 pixels/second)×(60 seconds÷600 pixels)×50 frames per second=500 frames.

Additionally or alternatively, a swiping gesture moving faster than the inflection value may result in the playhead moving proportionally faster than the swiping gesture. Such a swiping gesture may be particularly beneficial in moving the playhead throughout relatively longer media files.

As yet another example, the playhead 4 may not necessarily move at a speed directly proportional to the speed of the swiping gesture, but rather any algorithm or relationship dependent on the swiping gesture speed and the inflection value may be used to determine the speed of the playhead 4. The algorithm may be dependent on a variety of parameters, and the number of frames by which to move the playhead 4 may be dependent upon Furthermore, in some examples, the direction of the movement of the playhead 4 may correspond to the direction of the swiping gesture. A swiping gesture to the right may result in an increase in a point in time or a "fast forwarding" of the media file. A swiping gesture to the left may result in a decrease in a point in time or a "reverse" or "rewind" of the media file. In some examples, the seek calculation may be calculated as a negative number, indicating a leftward or backwards seek or movement of the playhead 4.

Returning to FIG. 3, as shown by operation 320, the apparatus 20 may include means, such as processor 24 and/or the like, for identifying an updated playhead position based on a previous position of the playhead 4 and the seek calculation. Each seek calculation described above may be provided to adjust the playhead 4 from a previous position. If the result of the seek calculation is determined to be −10 seconds, the updated playhead position is identified based on subtracting 10 seconds from a previous playhead position. As shown by operation 330, in some embodiments, the apparatus 20 may include means, such as processor 24, user interface 28, and/or the like, for causing the playhead to move to the updated playhead position.

FIG. 4 provides an illustration of the example user interface depicted in FIG. 1 following movement of the playhead 4. As is illustrated in FIG. 4, and in comparison to the previous state of the user interface in FIG. 1, the swiping gesture 12 reflects a movement of the pointing object 10 to the right. In some examples, and as illustrated in FIG. 4, causing the playhead 4 to move to the updated played position may include displaying playhead 4 in the updated position on the media bar 6. In some examples, the playhead 4 and/or media bar 6 may not be displayed, but the playhead 4 is nevertheless updated such that a user may begin playback or allow for other configurations and editing of the media file at the corresponding point in time of the media file. The playback and/or displayed frame of the media file in area 2 may be updated accordingly. For example, as illustrated in FIG. 4, the area 2 is updated to play or reflect the paused frame of the media file based on the updated playhead position. In some example embodiments, playback may occur along with the swiping gesture at speeds commensurate with the movement of the playhead 4 so as to provide a fast forward or rewinding effect in area 2. The timestamp 8 associated with the playhead position may be updated accordingly, or in some examples, the timestamp 8 may not be displayed.

In some examples, operations 340-370 may be optionally provided as indicated by the dashed lines. In this regard, a user may continue a swiping gesture at varying speeds and/or directions to fine-tune the playhead to the precise frame desired, such as for playback or other media file editing.

As shown by operation 340, the apparatus 20 may include means, such as the user interface 28, processor 24, and/or the like, for receiving an indication of a continuation of the swiping gesture in an instance a pointing object is not removed from the touch screen display surface during the swiping gesture. For example, the above operations 300-330 may enable scrubbing of the media file such that the playhead 4 is moved to generally the desired portion or point in time of the media file. In some embodiments, a pointing object 10 may maintain contact with the touch screen display 29, and continue the swiping gesture, which may include a change in speed and/or direction of the swiping gesture. As described above, in some examples, the playhead 4 may move proportionally to the speed of the swiping gesture. A user may therefore start with a relatively fast swiping gesture speed, and gradually slow the swiping gesture, changing directions if necessary, to hone in on the desired portion of the media file.

As such, continuing to operation 350, the apparatus 20 may include means, such as the processor 24 and/or the like, for performing a second seek calculation based on a second speed that varies from the first speed, a second direction of the continuation of the swiping gesture, a second distance of the continuation of the swiping gesture, and the inflection value. Similar to operation 320 above, as shown by operation 360, the apparatus 20 may include means, such as processor 24 and/or the like, for identifying a second playhead position based on the updated playhead position and the second seek calculation. Similar to operation 330 above, as shown by operation 370, the apparatus 20 may include means, such as processor 24 and/or the like, for causing the playhead 4 to move to the second playhead position. Any of the operations 300-370 may therefore be repeated to enable a user to move the playhead 4 to the general desired portion of the media file.

In some examples, a user may desire to move the playhead 4 to a precise frame of the media file. In this scenario, a threshold speed may be used such that when the swiping gesture speed falls below the threshold speed, the inflection value is no longer used to calculate the movement of the playhead 4, but rather, the playhead 4 moves at a predefined rate, such as one frame at a time per unit of distance of the swiping gesture. FIG. 5 provides example operations of the apparatus 20 to enable a user to move the playhead 4 one frame at a time, according to example embodiments in which the swiping gesture speed is less than the threshold speed.

For example, at operation 400, the apparatus 20 may include means, such as processor 24 and/or the like, for determining a unit of required distance of the swiping gesture by which to move the playhead one frame. For example, the unit of required distance may be predefined and fixed. In some examples, the unit of required distance may be determined based on a size of the mobile device 22 and/or touch screen display 29 for example. Dynamic determination of the unit of required distance may therefore ensure a user has enough space to fine tune the playhead to the precise frame desired. A required distance of the swiping gesture of the swiping gesture by which to move the playhead one frame may be 10 pixels, for example.

As shown by operation 410, the apparatus 20 may include means, such as processor 24, user interface 28, and/or the like, for determining the first speed is less than a threshold speed. As another example, the apparatus 20 may determine that a speed of the continuous swiping gesture drops below a threshold speed. The threshold speed may be predefined and stored on memory 26, for example. As an alternative, the threshold speed may be calculated based on the length of the media file and/or length of the touch screen display 29, for example, so as to enable efficient inputs by the user without running out of space on the touch screen display 29. A threshold speed may be 20 frames per second, for example.

Regardless of how the threshold speed is determined, once the swiping gesture speed falls below the threshold speed, at operation 420, the apparatus 20 may include means, such as processor 24, user interface 28, and/or the like, for causing the playhead to move at the predefined rate, such as one frame per unit of required distance of the swiping gesture. The user may therefore continue to drag or swipe the pointing object 10 at relatively slow speeds (e.g., below the threshold speed), to fine tune and precisely move the playhead to the desired point in time of the media file. The user may achieve this fine tuning by redirecting the swiping gesture back and forth in either direction. Swiping gestures to the right, made below the threshold speed, may advance the playhead 4 one frame at a time, while movement to the left may reverse the playhead 4 one frame at a time. Referring to the above example with a threshold speed of 20 pixels per second and the unit of required distance of the swiping gesture being 10 pixels, when a user slows the swiping gesture to less than 20 pixels per second, the playhead 4 may move one frame at a time for each 10 pixels of the touch screen display 29 covered by the swiping gesture.

In some examples, the user may move the playhead 4 to the desired frame with one continuous swiping gesture and may not lift the pointing object 10 until the desired frame is reached. In some examples, according to operation 430, apparatus 20 may include means, such as processor 24, user interface 28, and/or the like, for causing playback of the media file at a current playhead position in response to removal of the swiping gesture. That is, once the pointing object 10 no longer contacts the touch screen display 29, the playback resumes. As an alternative example, the playhead 4 may remain paused such that playback does not resume, but the user interface 28 may change from a scrubbing mode to another mode, such as a video editing mode. A scrubbing mode may be a state of the user interface 28 in which touch inputs and/or swiping gestures are interpreted so as to result in movement of the playhead 4 as described herein, while other modes may interpret touch inputs and/or swiping gestures to perform some other operation.

In this regard, as the playhead 4 remains paused, the user may provide additional inputs via the user interface 28 to engage other applications and/or functions of the apparatus 20. For example, the user may select an audio file to incorporate into the media file at the current playhead position. As yet another example, a user may utilize other applications to edit a particular frame of the media file, and/or add special effects. Furthermore, the user may select a frame for the purposes of extraction of a frame, for instance extract a particularly flattering facial expression, or highlight of a fast moving performance. A particular frame may be selected to define an identifiable frame as the poster, cover frame, or thumbnail image for the media file. A user may pick a frame to become the new in- or out-point, such as to remove a distraction or mistake from a video. In general, embodiments provided herein may be used to view and analyze fast movements from a media file.

Embodiments provided herein enable users to scrub a media file on any device, but are particularly beneficial on mobile devices having limited display space. Varying the movement of the playhead 4 based on the speed of the swiping gesture provides the user with fine control of the playhead 4. According to example embodiments, a user may provide continuous, single-finger touch inputs to precisely select a desired frame. Other methods providing scene selection by physical movement of a slider or scroll bar resulting in a constant movement of the playhead 4 at fixed rate allow for only generalized selection of portions of the media file. Particularly with longer media files, and/or small device displays, the user will otherwise find great difficulty in moving the pointing object 10, playhead 4, slider, and/or scrollbar the precise and fine-grained distances required to achieve movement of the playhead 4 frame by frame. As such, the method, apparatus and computer program product provide numerous technical advantages including the conservation of processing resources and the associated power consumption otherwise expended to support attempt after attempt of a user selecting a desired frame of a media file, so as permit the user to move the playhead 4 to a desired frame in a more expeditious and efficient manner.

In addition to supporting scrubbing of media files, the computing device and/or apparatus 20 provided herein may be configured to support one or more other functions. For example, the computing device of an example embodiment may also support a mapping application so as to present maps or otherwise provide mapping information. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or global positioning system (GPS) data associations (such as using known or future map matching or geo-coding techniques), for example.

In example embodiments, the road segment data records are links or segments representing roads, streets, or paths, as can be used in the calculated route or recorded route information for determination of one or more personalized routes, according to example embodiments. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the computing device, for example. The navigation-related functions can correspond to vehicle navigation, pedestrian navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database can be a master geographic database, but in alternate embodiments, the client side geographic database can represent a compiled navigation database that can be used in or with the computing device to provide navigation and/or map-related functions. For example, the geographic database can be used with the end user device to provide an end user with navigation features. In such a case, the geographic database can be downloaded or stored on the computing device, such as in applications, or the computing device can access the geographic database through a wireless or wired connection (such as via a server and/or a communication network), for example.

In one embodiment, the computing device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display.

Thus, in addition to enabling scrubbing of media files as described above, a user can use the computing device of an example embodiment for navigation and/or guidance along a mapped route. For example, a user may provide swiping gestures of various speeds and directions to navigate along a planned route. In some examples, a virtual location along a planned route may move at speeds calculated according to example embodiments, similar to the movement of the playhead for scrubbing of a media file. Information regarding the virtual location, such as points of interest, traffic information, satellite imagery, and/or pre-captured imagery may therefore be provided on a display of the computing device as the virtual location is updated. In this regard, in additional to the left and right movements of the swiping gesture corresponding to movements of the playhead within a media file, swiping gestures made in any direction on the touch screen display may be detected and/or otherwise received such that a corresponding navigational direction along a planned route is reflected on the user interface.

As yet another example, example embodiments provided herein may be applied to zooming in and out of and/or panning of images, and/or frames of video content. Particularly high level imagery, such as satellite imagery, may be improved by applying an example embodiment provided herein. A user could therefore zoom and/or pan to a precisely desired area and focus of an image using a mobile device.

As described above, FIGS. 3 and 4 illustrate a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for enabling scrubbing of a media file with use of a touch screen display, the method comprising:
   receiving an indication of a swiping gesture;
   calculating a seek calculation comprising a number of frames by which to move a playhead, wherein the seek calculation is based on a first speed of the swiping gesture, the distance of the swiping gesture, and an inflection value, wherein (a) the inflection value is a predefined rate and (b) the seek calculation is based on a ratio of the first speed and the inflection value, wherein, when the first speed of the swiping gesture is less than the inflection value, the distance of the swiping gesture corresponds to a smaller number of frames than when the first speed of the swiping gesture is greater than the inflection value;
   identifying an updated playhead position based on a previous position of the playhead and the seek calculation; and
   causing the playhead to move to the updated playhead position,
   wherein the seek calculation is calculated in frames as a direct proportion of (a) the ratio of the first speed and the inflection value and (b) the first distance.

2. The method according to claim 1, further comprising:
   receiving an indication of a continuation of the swiping gesture, wherein a pointing object is not removed from the touch screen display surface during the swiping gesture;
   calculating a second seek calculation based on a second speed that varies from the first speed, a second direction of the continuation of the swiping gesture, a second distance of the continuation of the swiping gesture, and the inflection value;
   identifying a second playhead position based on the updated playhead position and the second seek calculation; and
   causing the playhead to move to the second playhead position.

3. The method of claim 2, wherein the continuation of the swiping gesture comprises a change in direction such that second direction of the continuation of the swiping gesture is opposite of the first direction of the swiping gesture.

4. The method of claim 1, further comprising:
   causing playback of the media file at a current playhead position in response to removal of the swiping gesture.

5. The method of claim 1, wherein the inflection value is a predefined number of frames per second, the first speed is determined in pixels per second, and the first distance is determined in pixels.

6. The method of claim 1, further comprising:
   determining a unit of required distance of the swiping gesture by which to move the playhead one frame;
   determining the first speed is less than a threshold speed; and
   causing the playhead to move one frame per unit of required distance of the swiping gesture.

7. An apparatus enabling scrubbing of a media file with use of a touch screen display, the apparatus comprising at least one processor and at least one memory including computer program code, the at least one memory and the computer program code configured to, with the processor, cause the apparatus to perform at least:
   receiving an indication of a swiping gesture;
   calculating a seek calculation comprising a number of frames by which to move a playhead, wherein the seek calculation is based on a first speed of the swiping gesture, the distance of the swiping gesture, and an inflection value, wherein (a) the inflection value is a predefined rate and (b) the seek calculation is based on a ratio of the first speed and the inflection value, wherein, when the first speed of the swiping gesture is less than the inflection value, the distance of the swiping gesture corresponds to a smaller number of frames than when the first speed of the swiping gesture is greater than the inflection value;
   identifying an updated playhead position based on a previous position of the playhead and the seek calculation; and
   causing the playhead to move to the updated playhead position, wherein the seek calculation is calculated in frames as a direct proportion of (a) the ratio of the first speed and the inflection value and (b) the first distance.

8. The apparatus according to claim 7, wherein the at least one memory and the computer program code are further configured to cause the apparatus to perform at least:
receiving an indication of a continuation of the swiping gesture, wherein a pointing object is not removed from the touch screen display surface during the swiping gesture;
calculating a second seek calculation based on a second speed that varies from the first speed, a second direction of the continuation of the swiping gesture, a second distance of the continuation of the swiping gesture, and the inflection value;
identifying a second playhead position based on the updated playhead position and the second seek calculation; and
causing the playhead to move to the second playhead position.

9. The apparatus according to claim 8, wherein the continuation of the swiping gesture comprises a change in direction such that second direction of the continuation of the swiping gesture is opposite of the first direction of the swiping gesture.

10. The apparatus according to claim 7, wherein the at least one memory and the computer program code are further configured to cause the apparatus to perform at least:
causing playback of the media file at a current playhead position in response to removal of the swiping gesture.

11. The apparatus according to claim 7, wherein the inflection value is a predefined number of frames per second, the first speed is determined in pixels per second, and the first distance is determined in pixels.

12. The apparatus according to claim 7, wherein the at least one memory and the computer program code are further configured to cause the apparatus to perform at least:
determining a unit of required distance of the swiping gesture by which to move the playhead one frame;
determining the first speed is less than a threshold speed; and
causing the playhead to move one frame per unit of required distance of the swiping gesture.

13. A computer program product enabling scrubbing of a media file with use of a touch screen display, the computer program product comprising at least one non-transitory computer-readable storage medium having computer-executable program code instructions stored therein, the computer-executable program code instructions comprising program code instructions for:
receiving an indication of a swiping gesture;
performing a seek calculation comprising a number of frames by which to move a playhead, wherein the seek calculation is based on a first speed of the swiping gesture, the distance of the swiping gesture, and an inflection value, wherein (a) the inflection value is a predefined rate and (b) the seek calculation is based on a ratio of the first speed and the inflection value, wherein, when the first speed of the swiping gesture is less than the inflection value, the distance of the swiping gesture corresponds to a smaller number of frames than when the first speed of the swiping gesture is greater than the inflection value;
identifying an updated playhead position based on a previous position of the playhead and the seek calculation; and
causing the playhead to move to the updated playhead position,
wherein the seek calculation is calculated in frames as a direct proportion of (a) the ratio of the first speed and the inflection value and (b) the first distance.

14. The computer program product according to claim 13, wherein the computer-executable program code instructions further comprises program code instructions for:
receiving an indication of a continuation of the swiping gesture, wherein a pointing object is not removed from the touch screen display surface during the swiping gesture;
calculating a second seek calculation based on a second speed that varies from the first speed, a second direction of the continuation of the swiping gesture, a second distance of the continuation of the swiping gesture, and the inflection value;
identifying a second playhead position based on the updated playhead position and the second seek calculation; and
causing the playhead to move to the second playhead position.

15. The computer program product according to claim 14, wherein the continuation of the swiping gesture comprises a change in direction such that second direction of the continuation of the swiping gesture is opposite of the first direction of the swiping gesture.

16. The computer program product according to claim 13, wherein the computer-executable program code instructions further comprises program code instructions for:
causing playback of the media file at a current playhead position in response to removal of the swiping gesture.

17. The computer program product according to claim 13, wherein the inflection value is a predefined number of frames per second, the first speed is determined in pixels per second, and the first distance is determined in pixels.

18. The computer program product according to claim 13, wherein the computer-executable program code instructions further comprises program code instructions for:
determining a unit of required distance of the swiping gesture by which to move the playhead one frame;
determining the first speed is less than a threshold speed; and
causing the playhead to move one frame per unit of required distance of the swiping gesture.

* * * * *